Sept. 27, 1966 J. H. KING 3,275,971

CONNECTOR

Filed Aug. 7, 1964

5 Sheets-Sheet 1

INVENTOR
J. H. KING
BY [signature]
ATTORNEY

Sept. 27, 1966 J. H. KING 3,275,971

CONNECTOR

Filed Aug. 7, 1964 5 Sheets-Sheet 3

Sept. 27, 1966 J. H. KING 3,275,971

CONNECTOR

Filed Aug. 7, 1964 5 Sheets-Sheet 4

Sept. 27, 1966 J. H. KING 3,275,971

CONNECTOR

Filed Aug. 7, 1964 5 Sheets-Sheet 5

3,275,971
CONNECTOR

John H. King, Chatham, N.J., assignor to Bell Telephone Laboratories, Incorporated, New York, N.Y., a corporation of New York Filed Aug. 7, 1964, Ser. No. 388,144
5 Claims. (Cl. 339—151)

This invention relates to an electrical connector and more specifically, to a mobile test connector that is adapted to make electrical contact with a plurality of test points or conductors.

One of the underlying principles upon which the telephone industry and similar industries operate is to bring together a large number of electrical conductors in a central location and then subsequently interconnect them, when required, by a comprehensive switching system. The conductors coming into the location must be subjected periodically to a variety of electrical tests in order to insure the efficient operation of the system. It is obvious that the task of locating, identifying, and then connecting the desired test equipment to a single conductor or pair of conductors is prohibitive from a time and cost standpoint. Therefore, it is desirable to be able to make electrical connections with a large number of conductors at one time and to be able to interchange and interconnect various test pieces with these conductors without having to make new connections with each conductor for each individual piece of test apparatus used.

Numerous methods and devices are known in the prior art for making temporary connections to a large number of conductors. For example, current practice includes such methods as soldering or connecting test leads or probes to the conductors to be tested, using special test equipment with special connectors, using jack strips with individual test points and using connectors that make temporary connections to the equipment to be tested. However, a device that merely makes temporary connections is not sufficient. The device must also be versatile by being compatible with more than one installation, adaptable to more than one use and selective in the circuits with which it is interconnected. In telephone installations, some pairs of wires cannot be interfered with. Connections having to do with police, fire, hospital, defense and similar occupations cannot stand to be interrupted for even the shortest time. Therefore, an acceptable test connector must be able to make connections to a large number of conductors but still be selective as to specific single conductors or pairs.

The invention is embodied within a test connector comprising a body member that includes a plurality of paired contacts. The individual contacts are mounted upon supports which are in turn pivotally attached to the body. Each pair of contacts are operable by means of a single plunger. An actuating plate is also hinged to the body and operated by means of a cam and lever arrangement. The individual plungers extend through the plate and are operable in concert by means of the cam and lever.

Each contact is connected by means of a wire to a secondary connector whose face is displayed on the front part of the body. The items of test apparatus to be used are supplied with a connector that will mate with the secondary connector or connectors on the body. Thus, electrical continuity is established between any desired test instrument and the conductors to be tested by means of the device.

The advantages of the device over the prior art are numerous. First, the device makes contact with a plurality of electrical conductors by means of operating one cam and lever. Yet, control of specific individual pairs of contacts, regardless of the cam-lever operation, may be reserved by operating the plunger associated with each pair of contacts. The inclusion of secondary connectors allows test units to be connected and disconnected without having to re-establish individual contacts with the various conductors being tested.

The invention will be better understood and its advantages and features will be more readily apparent upon the study of the following detailed description of an illustrative embodiment when read in conjunction with the drawing, in which.

Figure 1:
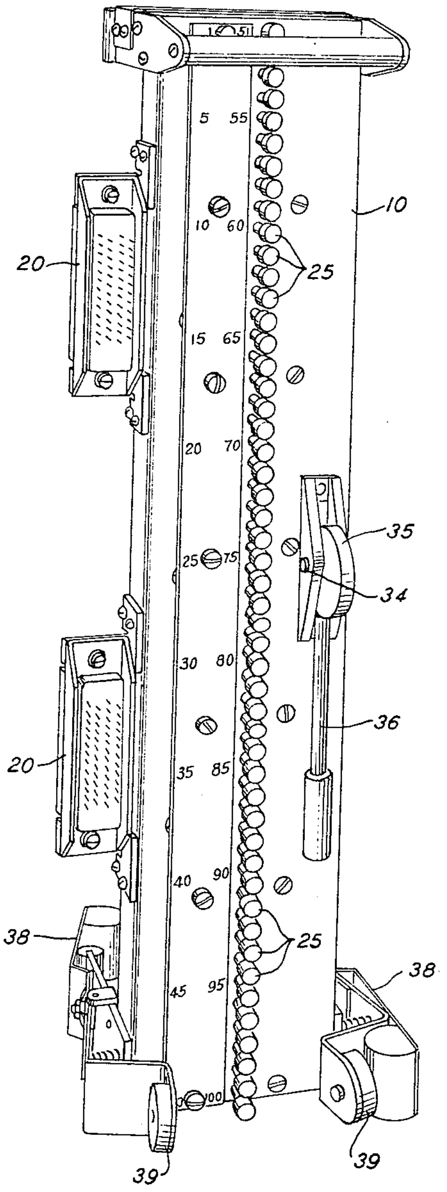
FIG. 1 is a perspective view of one embodiment of the invention.

The illustrative embodiment of the invention shown in the various figures comprises a body member 10 that is generally channel or U-shaped in form. Rigidly attached to the member 10 by means of spacers 11 is a mounting platform 12. A plurality of spacers 13 are mounted crosswise or perpendicular to longitudinal axis of the platform 12. These spacers 13 are held in a spaced-apart relationship by means of their attachment to the platform 12 and by means of two pivot rods 14 that run the length of the device.

The region between two adjacent spacers 13 forms a compartment in which is located a pair of contact supports 15. The supports 15, in the preferred embodiment, are formed from a hard, rigid insulating material such as a phenolic resin. Each support includes a pivot notch 16 and an actuating lever 17. The supports 15 are urged toward each other and consequently held on the pivot rods 14 by means of a spring 18.

Figure 7:
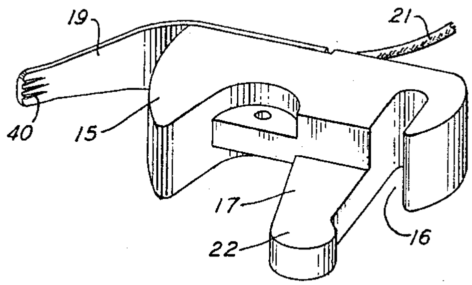
FIG. 7 is a perspective view of one of the contacts and its contact support.

Electrical contacts 19 are located on the extremities of the supports 15. A contact 19 and its associated support is illustrated in FIG. 7. The end of the contact 19 may be coated or plated with precious metal to enhance its conducting properties. In addition, grooves 40 may be indented by well-known methods such as coining, to assist the contact 19 in making good physical and electrical contact. The grooves 40 essentially reduce the contact area and thus increase contact pressure with no increase in contact force. The relatively small contact area produces high contact stresses sufficient to penetrate oxidation products.

Figure 3:
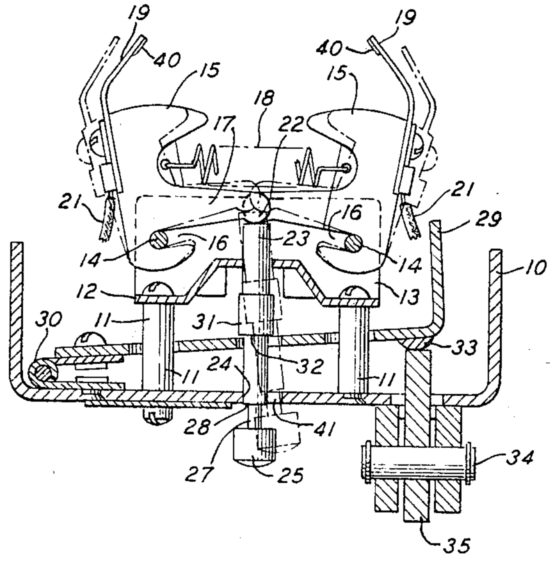
FIGS. 3 and 4 are section views taken generally along the line 4—4 of FIG. 2 showing the operation of the device.
Figure 4:
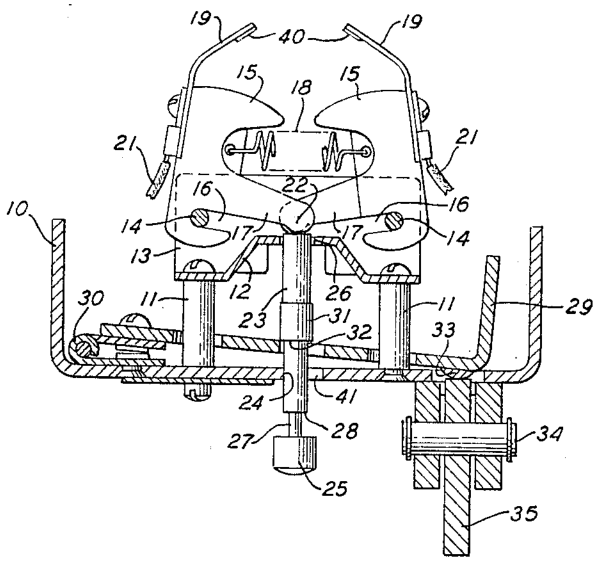
Figure 5:
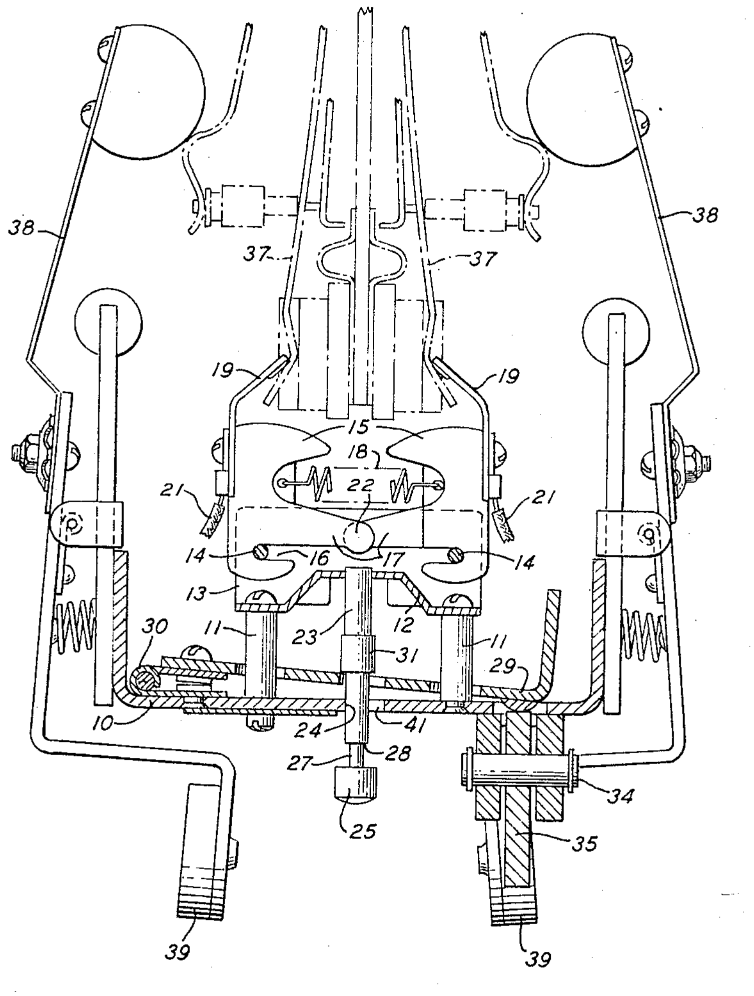
FIG. 5 is a section view taken generally along the line 4—4 of FIG. 2 showing one contemplated use of the device.

Each contact 19 may be interconnected in any desired arrangement with the connectors 20 shown on the face of the device in FIG. 1, by means of individual wires 21 as shown in FIGS. 3, 4, and 5. Thus, between each pair of spacers 13 is located a pair of contact supports 15 pivotally mounted on pivot rods 14. Each support 15 includes a contact 19.

The supports 15 are mounted upon the device by engaging the notches 16 with the pivot rods 14 as shown in FIGS. 3, 4, and 5. The contacts 19 are drawn toward each other by the spring 18 which rotates the supports 15 about the rods 14. The degree of rotation is limited by restricting the motion of either the contacts 19 or the levers 17 by structure to be described subsequently.

Figure 2:
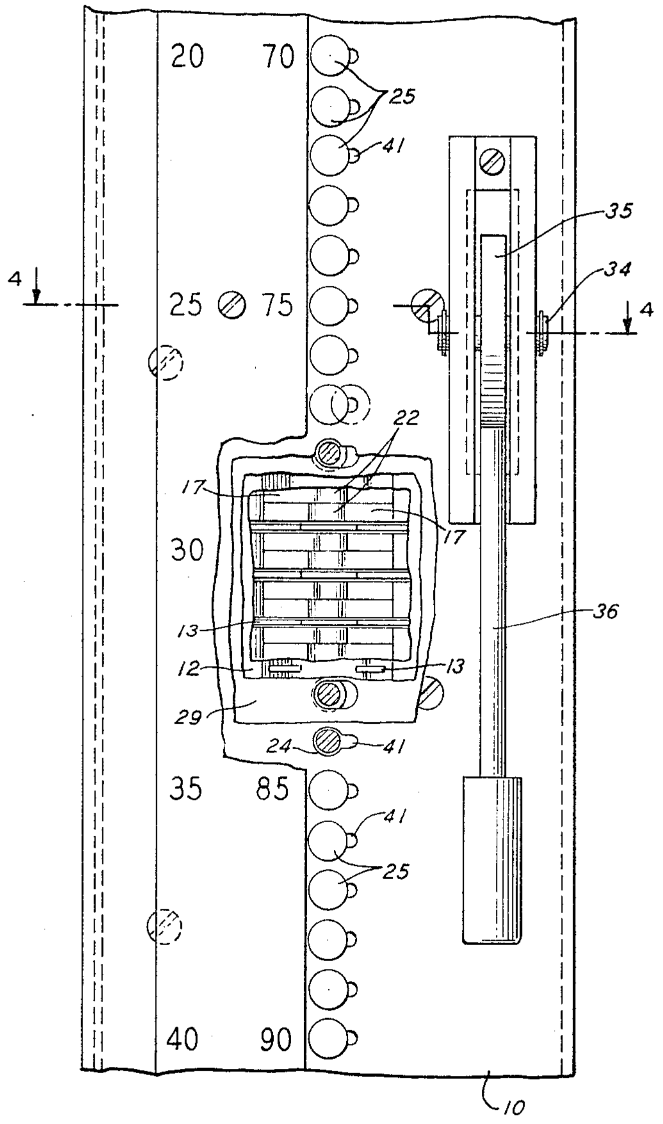
FIG. 2 is an enlarged plan-section view of one portion of the device shown in FIG. 1.

As shown in FIG. 2, the levers 17 of the two supports 15 located between each pair of spacers 13 overlap each other in a rounded portion 22. A plunger 23 bears against the portion 22 and controls the rotational movement of the supports 15 around the rods 14. The plunger 23 extends through a round hole 26 in the platform 12 and through a formed slot 24 in the body member 10. The plunger 23 terminates in a cap 25 that may be color coded if desired. The cap 25 is of a larger diameter than the slot 24, thus acting as a depression limiting stop for the plunger 23.

The function of each plunger 23 is to control the operation of a pair of supports 15 and thus to control the opening and closing of each individual pair of contacts 19. When a plunger 23 is depressed, the end of the plunger urges the lever portions 22 in a direction away from the platform 12. This causes a rotation of the supports 15 about the rods 14 in a direction that opens the contacts 19 and is in opposition to the force generated by the spring 18. Motion of the plunger 23 in the opposite direction results in a reversal of the operations described above.

A portion of the shank of the plunger 23 adjacent the cap 25 is reduced in diameter, resulting in a neck 27 and a shoulder 28. The slot 24 in the body member 10 has the shape of a keyhole, that is, the slot 24 has a large diameter circular hole having a smaller elongated opening 41 adjacent one edge of the larger opening. The diameter of the larger opening is sufficient to allow the shank of the plunger 23 to pass through it, while the smaller elongated opening 41 is of a width sufficient to receive the neck portion 27 of the plunger but not the main portion of the plunger 23. The plunger 23, when depressed, may be pushed sideways as shown in FIG. 3, such that the neck portion 27 slips into the elongated opening 41 of the slot 24. The spring 18 resists the depression of the plunger 23 and attempts to rotate the contact supports 15 to a closed position, thus exerting a longitudinal force on the end of the plunger 23 that butts the shoulder 28 against the edges of the elongated opening 41 of the slot 24. The result is that the plunger 23 locks the contact supports 15 in an opened position, as shown in FIG. 3.

It is obvious that each pair of contacts may be operated individually by means of the plungers 23 as described above. However, such an operation would be time consuming and cumbersome. The embodiment of the invention therefore includes means for operating all of the contact supports 15 in concert. An operating or actuating plate 29 is hinged to the body 10 by means of a hinge 30. The shank of the plunger 23 extends through a hole in the plate 29. The shank of the plunger 23 includes a portion of enlarged diameter 31 that results in a second shoulder 32. The diameter of the hole in the plate 29 is of sufficient diameter to pass the shank of the plunger 23 but not the enlarged portion 31. The plate further includes a cam bearing surface 33. Mounted on the body 10 by means of an axle 34 is a cam 35 which is operated by means of a handle 36 about the axle 34. The cam 35 contacts the cam bearing surface 33.

Figure 6:
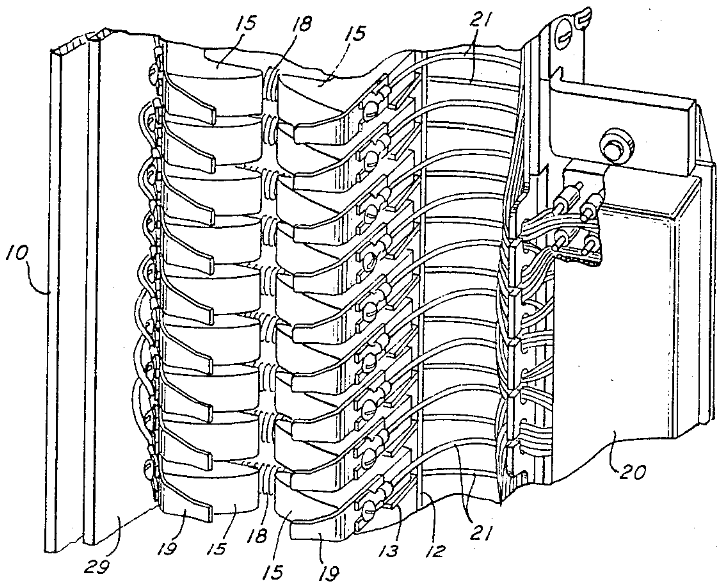
FIG. 6 is a perspective view of the opposite side of the embodiment shown in FIG. 1.

FIG. 4 shows the device with the contact supports 15 in a closed position. The plate 29 is almost contiguous with the body member 10. Rotation of the handle 36 rotates the cam 35 and pushes the plate 29 away from the body member 10 and toward the platform 12. Inasmuch as the enlarged diameter portion 31 will not fit through the hole in the plate 29, the movement of the plate 29 causes all the plungers 23 to be operated in concert, thus opening all the contact supports 15 as shown in FIG. 3. Rotation of the cam 35 by means of the lever 36 in the opposite direction results in a reversal of the operative steps described above and consequently a closing of the contacts 19 as shown in FIGS. 4 and 6.

A study of FIGS. 3 and 4 indicates that if an individual pair of contact supports 15 are locked in an open position by means of pushing the plunger 23 sideways into the elongated opening 41 of the slot 24, that the lever 36 and cam 35 may be operated at liberty without affecting the locked open pair. The reason for this is that when a plunger 23 is depressed and locked, the actuating plate 29 may be moved or actuated without causing the shoulder 32 to butt against the plate 29. The shoulder 32 has traveled in a longitudinal direction toward the platform 12 a greater distance than the actuating plate 29 does when it is moved by the cam 35. Thus, if any designated pair of wires in a central location represents a fire, police, ambulance, or defense service, all other adjacent lines may be tested without interrupting the service on the designated pair.

FIG. 5 shows one contemplated use for the device. The contacts 19 are shown engaged with the electrical terminals 37 that in turn represent a pair of conductors that are to be tested. When the lever 36 is used to open or close the supports 15 the lever 36 and cam 35 must overcome the forces exerted by all of the springs 18 of the device. A considerable force must be exerted upon the lever 36 to operate it. This force has a tendency to rotate the device away from the structure to which it is desired to attach it. It is contemplated that a clamp comprised of two clamping bars 38 and two handles 39 be used on the bottom portion of the body 10. As shown in FIG. 5, they attach to the structure and resist the torque created by the operation of the lever 36. The clamping bars 38 may be folded back upon themselves as shown in FIG. 1 for storage purposes.

As shown in the various figures, the supports 15 are urged toward each other by the springs 18. Any pair of supports 15 and hence contacts 19 may be forced open or away from each other by overcoming the force exerted by the spring 18. It is obvious, therefore, that if the terminals 37 shown in FIG. 5, or any equivalent structure to which the device is to be attached, are blocked by foreign matter or a blocking tool, the device will still make contact with all the rest of the terminals 37. The foreign matter or blocking tool will merely overcome the force created by the spring 18 of the blocked terminal 37 while the other springs 18 will operate the other supports 15 and contacts 19. Similar reactions take place if a single pair of terminals 37 of a plurality are misaligned.

Numerous means within the skill of the art may be used for indexing this device upon the apparatus to which it is to be attached.

It is obvious to those skilled in the art that numerous changes and modifications may be made to the embodiment as it has been disclosed above without departing from the spirit and scope of the invention.

What is claimed is:

1. Apparatus for providing test connections for a plurality of pairs of electrical conductors comprising, in combination, a U-shaped body member, a platform member pivotally mounted on said body member, a support structure fixedly mounted on said body member, a plurality of pairs of contact members pivotally mounted on said support structure, said contact members normally being urged under spring force to maintain contact with corresponding ones of said conductors, means including said platform member for pivoting all of said contact members in concert thereby to break contact with said conductors and means for selectively locking pairs of said contact members in a relatively open position out of contact with said conductors whereby operation of said pivoting means makes or breaks contact between only preselected ones of said contacts and corresponding ones of said conductors.

2. Apparatus in accordance with claim 1 wherein said pivoting means includes a cam member, an aperture in said body member for accommodating said cam member and a lever for rotating said cam, said cam being in supporting relation to one edge portion of said platform member.

3. Apparatus in accordance with claim 1 wherein said locking means comprises a plurality of plungers each supportably mounted in respective accommodating apertures in said body member and in said platform member, one end of each of said plungers being adapted for hand actuation and the other being in driving pivotal contact with each of said contact members of a corresponding pair of said contact members.

4. Apparatus in accordance with claim 3 wherein said plungers include first and second shoulder members, each of said plungers being positionable laterally to a point at which one of said shoulder members bears against the inside surface of said body member whereby a corresponding one of said pairs of contact members is held in the locked-open position, the other of said shoulders of said last named plunger normally abutting one side of said platform member to permit said platform member to depress said plungers by its pivotal movement, said other of said shoulders being positioned for free movement in said accommodating aperture of said platform member with no abutting contact therebetween whenever the corresponding one of said plungers is in said locked-open position.

5. Apparatus in accordance with claim 1 wherein said contact members each includes a nonconducting body portion supporting a conductive portion, each of said contact members being rotatable in substantially parallel closely juxtaposed planes, and including pairs of spring members each mounted to exert a force tending to pivot a corresponding pair of said contact members toward each other.

References Cited by the Examiner

UNITED STATES PATENTS

| | | | |
|---|---|---|---|
| 2,032,518 | 3/1936 | Wheelock | 339—18 X |
| 2,261,761 | 11/1941 | Hanson et al. | 339—255 X |
| 2,968,019 | 1/1961 | Steinman et al. | 339—151 X |

References Cited by the Applicant

UNITED STATES PATENTS

| | | |
|---|---|---|
| 2,802,189 | 8/1957 | Bishop et al. |
| 2,825,037 | 2/1958 | French. |
| 2,927,295 | 3/1960 | Sitz. |

EDWARD C. ALLEN, *Primary Examiner.*

W. D. MILLER, *Assistant Examiner.*